May 31, 1932.  M. HUNTER  1,861,119
ELECTRICALLY HEATED BROODER
Filed April 4, 1931
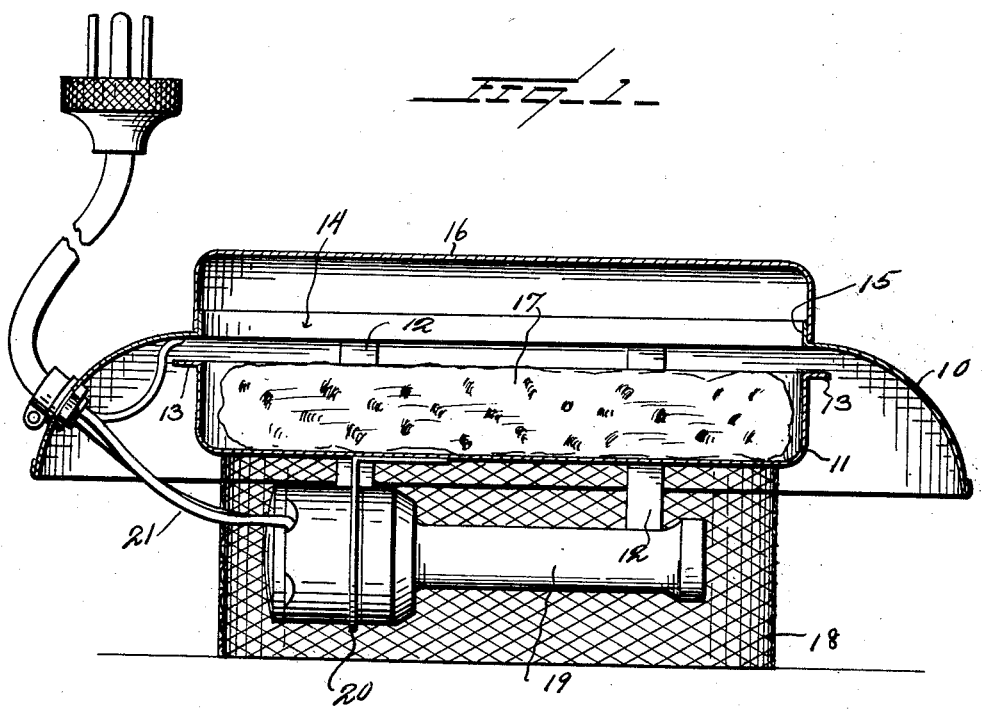
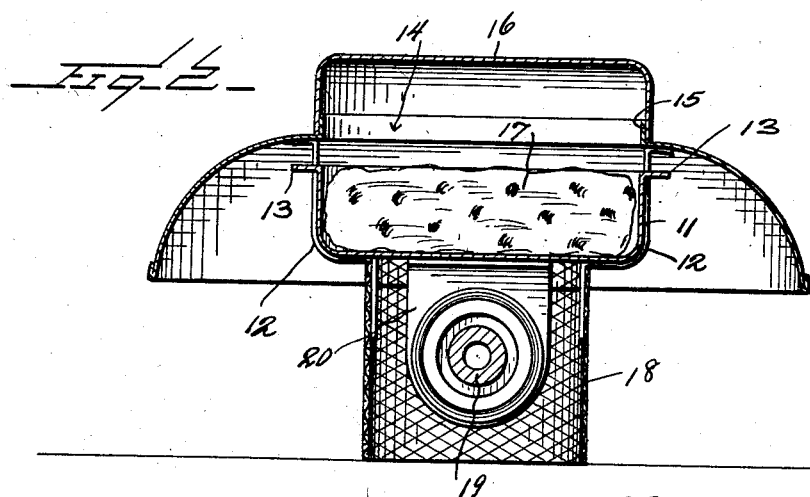
Inventor
M. Hunter
By Watson E. Coleman
Attorney Patented May 31, 1932

1,861,119

UNITED STATES PATENT OFFICE

MORRIS HUNTER, OF RICHMOND, VIRGINIA

ELECTRICALLY HEATED BROODER

Application filed April 4, 1931. Serial No. 527,835.

This invention relates to brooders and particularly to brooders designed for raising game birds in captivity, though it is also applicable to the raising of other fowl.

The general object of the invention is to provide a brooder of a very simple construction which may be heated electrically and particularly which is provided with a humidifier of improved construction disposed immediately above the heating means and which is so arranged within the brooder that the air within the brooder may circulate over the humidifier and thus obtain moisture therefrom.

A further object is to provide a humidifying device of this kind made as part of and unitarily with the brooder structure which will permit the humidifier to be replenished from time to time without the necessity of lifting up the brooder and removing a water pan or otherwise disturbing the structure, and further to provide a humifidier in which humidification can be regulated by increasing the size of the sponge disposed within the humidifier or the number and size of the wicks which may be used in place of the sponge.

Other objects will appear in the course of the following description.

My invention is illustrated in the accompanying drawings, wherein:—

Figure 1 is a longitudinal section through a brooder constructed in accordance with my invention;

Figure 2 is a transverse section thereof.

Referring to these drawings, 10 designates the hood of the hover which is preferably made of metal and may have any area, this hood being shown as rectangular in form, though I do not wish to be limited to this. Disposed below the hood and supported therefrom, is a humidifying pan 11. This pan is supported by straps 12 or any other suitable means with the flanged upper edge 13 of the pan 13 disposed in spaced relation to the hood 10. The hood just above the pan is cut out as at 14 and this opening 14 is defined by an upstanding flange 15 defining an opening of the same area as the area of the pan. A cover 16 is provided which fits over this upwardly extending flange 15. A sponge 17 is disposed within the pan and is designed to be filled with water. In place of the sponge, wicking may be used or any other absorbent material.

Attached to the straps 12, which straps are bent downward below the pan is a wall of stiff wire netting designated 18 which extends down and is adapted to rest upon the floor of the chicken house so as to support the hover. Disposed within the wall of wire netting is an electrically energized heating element 19 which is supported at one end by the bracket 20 attached to the bottom of the pan.

Wires 21 lead to this electrically energized heating element, these wires passing out through a cord clamp formed in the downwardly extending wall of the hover.

With this construction, the air within the hover is abundantly warmed by the heating element while the chicks, of course, are prevented from coming in contact with the heating element by the wire netting. The hot air passes into the upper portion of the hover and over the soaked sponge or wicking in the pan and thus the air is sufficiently humidified and kept in this humidified condition. Without humidification, small chicks, particularly the chicks of wild birds, such as quail, grouse and the like, will fall ill, but by providing proper humidification, the chicks, even of wild birds, will grow and thrive very well in proper hovers. The cover may be taken off at any time to rewet the sponge without in any way disturbing the chicks and without the chicks knowing that the cover has been removed. Water may be kept in the pan if desired in order to keep the sponge moist.

While I do not wish to be limited to the details of construction, yet these details are the results of practical experiments and I have found a hover constructed in accordance with my invention to be particularly effective.

It will be seen that placing the heating element immediately below the humidifying pan acts to heat the water in the sponge, wicks or pan and thus the vapor thus created will be readily taken up by the air circulating above the pan.

I claim:—

1. A hover of the character described, comprising a hood having downwardly extending side walls, the hood being formed with an opening in its top defined by an upwardly extending wall, a pan supported upon the hood below said opening, the pan having an outwardly extending flange at its upper edge spaced from the hood, the pan being adapted to contain an air moistening element, a cover adapted to fit over said flanges on the hood, an electrically energized heating element disposed immediately below and carried by the pan, and a wall of reticulated material extending downward from the pan and attached thereto, the wall constituting a support for the hover.

2. A hover of the character described, comprising a hood having downwardly extending side walls, the hood being formed with an opening in its top, a pan connected to the hood and disposed below said opening, the pan at its upper edge being spaced from the hood and being adapted to contain an air moistening element, a detachable cover normally closing the opening in the hood, an electrically energized heating element disposed immediately below and carried by the pan, and a wall of reticulated material extending downward from the pan and attached thereto, the wall constituting a support for the hover.

3. A hover comprising in one unit an open-work wall formed to constitute a hollow vertically disposed support, a pan resting on and operatively supported by and connected to said wall, a hood having its upper end disposed above the pan in spaced relation thereto, means operatively connecting the hood to and supporting it on said wall, the hood having a centrally disposed opening and extending downward and outward below the upper edge of the pan, a cover detachably engaging the hood and normally closing said opening, and a heating element disposed within said wall and immediately below the pan.

4. A hover comprising in one unit an upstanding open-work wall formed to provide a hollow supporting element, a pan supported by and operatively connected to said wall, a heating element disposed within the wall and operatively connected to and supported by the pan and immediately below the latter, a hood having its upper end disposed above the pan and in spaced relation to the upper edge thereof, means connected to the hood operatively supporting it upon said wall, the hood having a central opening and extending downward and outward, and a detachable cover normally closing the opening of the hood.

In testimony whereof I hereunto affix my signature.

MORRIS HUNTER.